H. E. WHITE.
SYSTEM OF MOTOR CONTROL.
APPLICATION FILED AUG. 3, 1908.
921,768.
Patented May 18, 1909.
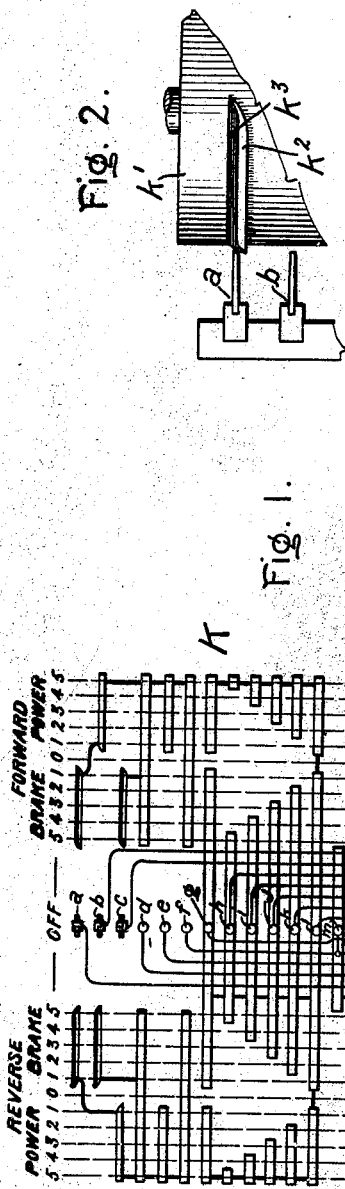
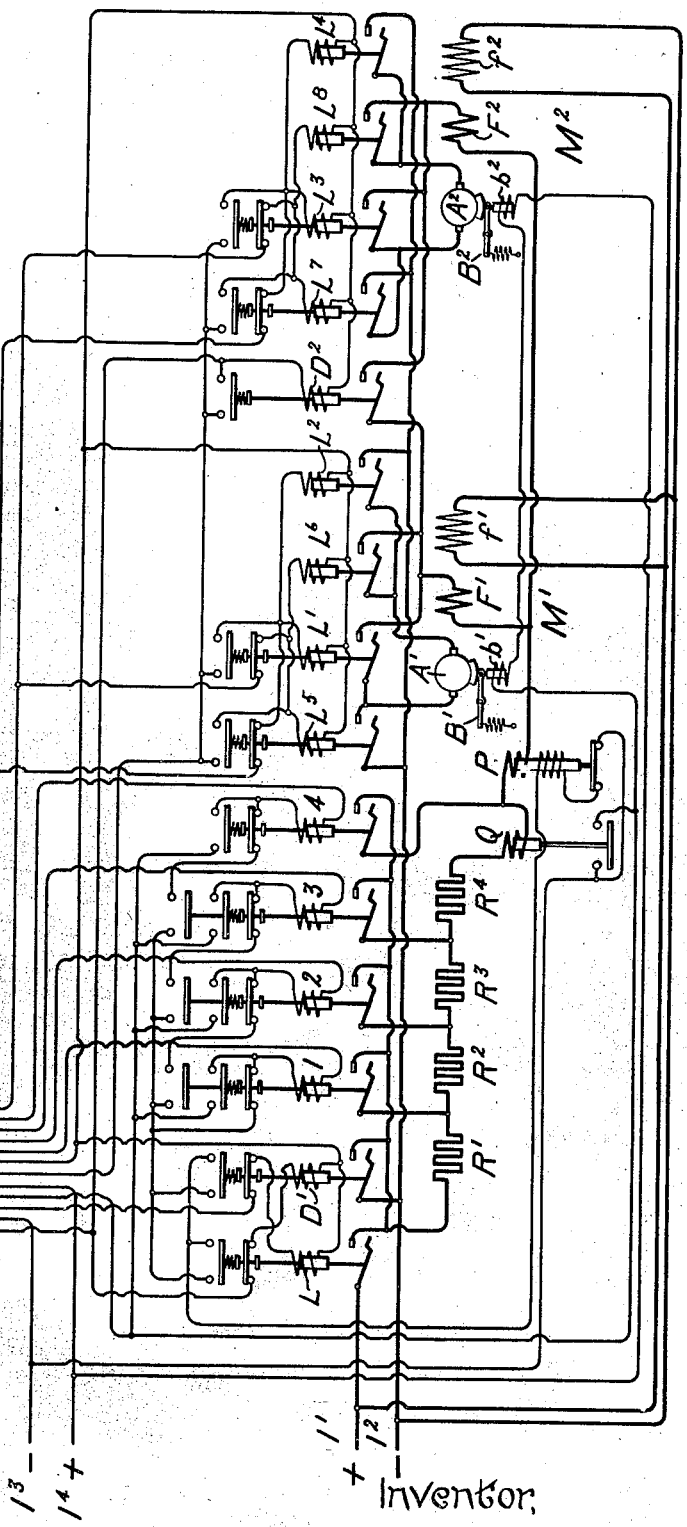
Witnesses:
George W. Tilden
J. Ellis Glen
Inventor,
Harold E. White,
by Albert L. Davis
Att'y.

UNITED STATES PATENT OFFICE.

HAROLD E. WHITE, OF SCHENECTADY, NEW YORK, ASSIGNOR TO GENERAL ELECTRIC COMPANY, A CORPORATION OF NEW YORK.

SYSTEM OF MOTOR CONTROL.

No. 921,768.  Specification of Letters Patent.  Patented May 18, 1909.

Application filed August 3, 1908. Serial No. 446,515.

*To all whom it may concern:*

Be it known that I, HAROLD E. WHITE, a citizen of the United States, residing at Schenectady, in the county of Schenectady, State of New York, have invented certain new and useful Improvements in Systems of Motor Control, of which the following is a specification.

The present invention relates to systems of control for electric motors, and particularly to those systems of control in which the motor or motors are braked dynamically by connecting them in a closed circuit through more or less resistance.

The object of my invention is to provide a new and improved system of control of the type in which a master-switch, having an "off" and forward and reverse, brake and power positions, controls a set of switches which control the motor connections and the amount of resistance in the motor circuit both under power and dynamic braking conditions.

The preferred form of my invention herein shown and described comprises two motors (although, as will be obvious, the system is equally applicable to one motor), electrically released mechanical brakes therefor, a starting resistance, a plurality of electrically controlled switches for connecting the motors to a source of current for either direction of rotation, for regulating the resistance in the motor circuit both under power and braking conditions and for properly connecting the motors in a closed circuit through said resistance for dynamic braking, a master-switch and a coöperating relay being employed for controlling the suitable operation of said switches and said mechanical brakes.

The form and arrangement of my improved system of control and its manner of operation will be understood from the following description taken in connection with the accompanying drawings.

In the drawing, Figure 1 is a diagrammatic illustration of a system of control having my invention embodied therein, and Fig. 2 is a detail view of a portion of the master switch shown in Fig. 1 illustrating the construction of certain contact fingers and segments.

In the particular system of control illustrated, two compound wound motors are shown at $M^1$ and $M^2$ arranged in parallel and supposed to be driving a common load, such as a hoist. The armatures of these motors are indicated at $A^1$ and $A^2$, their series fields at $F^1$ and $F^2$ and their shunt fields at $f^1$ and $f^2$. A source of motor current is indicated at $l^1$ and $l^2$ and a source of control current at $l^3$ and $l^4$, but of course under some conditions the motor and control circuits might the supplied from the same source. A starting resistance is shown made up of sections $R^1$, $R^2$, $R^3$ and $R^4$, which are short-circuited, respectively, by electrically controlled switches 1, 2, 3 and 4. An electrically controlled line switch L is arranged to connect the motor circuit with the source $l^1$, and the electrically controlled switches $L^1$, $L^2$, $L^3$, $L^4$, $L^5$, $L^6$, $L^7$ and $L^8$ serve to connect the armatures $A^1$ and $A^2$ and the series fields $F^1$ and $F^2$ in the proper relation for either direction of rotation and for dynamic braking. The electrically controlled switch $D^1$ completes the connection of the motors through the resistance for dynamic braking, and the switch $D^2$ serves to complete an equalizing connection between the motors $M^1$ and $M^2$ when the motors are being braked dynamically. A master-switch K controls the operation of the electrically controlled switches, this master-switch in the system shown being of the single drum type arranged for rotation in both directions from "off" position to effect forward and reverse operation of the motors, and also to suitably connect the motors through the resistance for dynamic braking, in a manner hereinafter described. The motors are shown as provided, respectively, with brakes $B^1$ and $B^2$ biased to an "on" position and adapted to be released by the energization of solenoids $b^1$ and $b^2$. Brakes of this character are well-known, and are used particularly in connection with hoists and similar forms of apparatus. Certain of the electrically controlled switches, which may be of any well-known type, are provided with interlocking contacts which are located in the control circuits. The form of these auxiliary switches is immaterial, as far as my invention is concerned, and I have shown them as of the well-known type, in which disks mounted upon a rod are moved into and out of engagement with fixed contacts, only because this type is especially well adapted for diagrammatic illustration. The disks which form the movable members of the auxiliary switches are shown in some cases as secured directly to the rods upon which they are supported, while in others they are supported by collars secured to the rods either directly or through small springs which allow a yielding connection with the rods, these arrangements being well-known to those familiar with this art. A notching relay P, of well-known form, serves to regulate, under the control of the motor current, the rate at which the resistance-controlling switches may close both when the motor is receiving current from the source and when it is acting as a generator for dynamic braking.

A relay Q having its actuating coil connected in the motor circuit in series with the last section of resistance $R^4$ controls contacts which, when the master-switch K is in its "off" position, complete a maintaining circuit through the two lower contact fingers and segments on the master-switch for maintaining the proper switches closed to cause dynamic braking and for holding the brakes $B^1$ and $B^2$ released after the master switch has been thrown to its "off" position until the motors have come substantially to rest, as will be hereinafter fully explained.

The arrangement of the fingers and segments of the master-switch K will be clear from the drawings. All the contact fingers on the master switch except the upper three make electrical connection with their coöperating segments in both directions of movement of the controller drum. The upper three contact fingers and their coöperating segments are so arranged, however, that in the initial movement of the drum in both forward and reverse directions from "off" position, electrical connection is not made between them while the drum is moving over the brake positions. However, after the master-switch has been moved either in a forward or reverse direction from "off" position beyond the brake positions, reverse movement of the drum will cause two out of the three upper fingers to electrically engage with their coöperating segments. A simple construction whereby this end may be attained is shown in Fig. 2 in which a portion of the controller drum is shown at $k^1$ and the two upper fingers at $a$ and $b$. The fingers $a$ and $b$ are composed of resilient leaves of conducting material mounted in metal blocks, which may be secured to a supporting bar as shown. The resilient contact fingers $a$, $b$ and $c$ coöperate with segments mounted upon the drum $k^1$, which may be of the form best shown in Fig. 2, composed of strips of conducting material $k^2$ above which are strips of insulating material $k^3$, the ends of this segment being inclined to the horizontal as shown. With this arrangement when the drum is moved in one direction the resilient fingers ride over and engage with the strip of insulating material $k^3$, but after the drum has been rotated through all the braking positions and is moved backward toward "off" position, the resilient fingers engage with the under side of the segment and make electrical contact with the strip $k^2$. Arrangements of this kind are well-known in this art and this particular construction shown forms no part of my invention. The segments which coöperate with the fingers $a$, $b$, $c$, $d$, $e$ and $f$ are electrically connected and since the finger $d$ is connected to the source $l^3$ engagement of the fingers $a$, $b$, $c$, $e$ and $f$ with their coöperating segments results in connecting these fingers to this side of the source. All the segments which coöperate with the fingers $g$, $h$, $i$, $j$, $k$ and $l$ both in the "off" and the "on" positions of the master-switch are electrically connected together, and since the finger $g$ is connected to the source $l^4$ engagement of the fingers $h$, $i$, $j$, $k$ and $l$ with their coöperating segments in any position of the master-switch results in connecting these fingers to the source $l^4$. The segments which coöperate with the fingers $m$ and $n$ in the "off" position of the master-switch are electrically connected together. The form and arrangement of the fingers and segments of the master-switch will be clear from the diagram to those skilled in this art.

The arrangement of control circuits can best be pointed out in a description of the operation of the system as a whole, which will now be set forth.

As shown, the master-switch K is in the "off" position, and the motors are at rest and held by the brakes $B^1$ and $B^2$. Under this condition all the electrically controlled switches are open, as shown, and the contacts controlled by the relay Q are open. Let us assume that the motors are to be operated in a direction corresponding to the "forward" movement of the master-switch K. As the drum of the master-switch is rotated to bring that half of it marked "Forward" into engagement with the contact fingers it passes successively through the positions marked "Brake." During this movement, and in fact in all the "on" positions of the master-switch, both "forward" and "reverse," the fingers $d$ and $f$ engage with their coöperating segments. This means that the finger $f$ in all "on" positions of the master-switch is connected to the source $l^3$, the effect of which is to complete a circuit from the source $l^4$, through the releasing coils of the brakes $B^1$ and $B^2$ to the source $l^3$, thereby insuring that the brakes are released whenever the master-switch is in an "on" position. Since, during the forward movement of the master-switch through the brake positions 5, 4, 3, 2 and 1, the fingers $a$ and $c$ ride over the insulated portion of their coöperating segments, no control circuits are energized during this movement of the master-switch and none of the electrically controlled switches are closed. During movement of the master-switch in an "on" direction through the brake positions, therefore, and even in the positions O, called a "coasting position," for reasons hereinafter explained, the motor circuit is not completed although the brakes are released. When the master-switch is moved in the "forward" direction to the first power position, the fingers $b$, $e$, $g$ and $l$ come into engagement with their coöperating segments. The effect of this, as may easily be traced on the diagram, is to complete circuits from the source $l^3$ and $l^4$, through the actuating coils of the electrically controlled switches L, $L^1$, $L^2$, $L^3$ and $L^4$, which in closing connect the armature $A^1$ and series field $F^1$ of the motor $M^1$ in parallel with the armature $A^2$ and the series field $F^2$ of the motor $M^2$, and both in series with all of the resistance $R^1$, $R^2$, $R^3$, and $R^4$ and across the source $l^1$ and $l^2$. The switches L, $L^1$, and $L^3$ in closing close their upper auxiliary switches and open their lower ones, as will be apparent from the diagram. When the master-switch is moved to its second power position the finger $k$ comes into engagement with its coöperating segment and a circuit is completed through the actuating coil of the switch 1, through the lower auxiliary switch of the switch 1, through the upper auxiliary switch of the switch L and through the actuating coil and contacts of the notching relay P to the source $l^3$, or if the relay Q has pulled up, as is likely, a circuit is also completed through its contacts and the finger $f$ on the master-switch to the source $l^3$. The switch 1, therefore, closes and short-circuits the section of resistance $R^1$. The switch 1 in closing closes its middle, opens its lower and closes its upper auxiliary switches, thereby shifting its actuating coil from the circuit through the notching relay P to a circuit through the finger $f$ to the source $l^3$, and by its upper auxiliary switch connecting the actuating coil of the switch 2 to the circuit through the notching relay P. Movement of the master-switch forward through the third, fourth and fifth power positions results in closing the switches 2, 3, and 4, this operation taking place under the control of the notching relay P in a well-known manner, it being obvious that the master-switch may be quickly thrown to its fifth power position after which the switches 1, 2, 3 and 4 will close automatically in succession. By moving the master-switch through its power positions, therefore, the switches 1, 2, 3 and 4 are controlled and the amount of resistance in the motor circuit regulated, thereby controlling the speed of the motors.

If at any time the master-switch is moved to the position O the electrically controlled switches all open and the motors are disconnected from the source and are free to coast, the brakes $B^1$ and $B^2$ being held released in this position of the master-switch as above explained.

If the master-switch is moved backward from the coasting position O to the first "forward" brake position the fingers $a$, $c$, $g$ and $i$ make electrical connection with their coöperating segments. Under this condition, as will be evident from the diagram, circuits are completed from the source $l^3$ and $l^4$ through the actuating coils $D^1$, $D^2$, $L^5$, $L^6$, $L^7$ and $L^8$, thereby causing these switches to close. Closing of these switches results in reversing the relation of the armature $A^1$ to its series field $F^1$ and the relation of the armature $A^2$ to its series field $F^2$ and in connecting the armature and series field of the motor $M^1$ in parallel to the armature and series field of the motor $M^2$ in a closed circuit through all of the resistance $R^1$, $R^2$, $R^3$ and $R^4$, the switch $D^2$ serving to complete an equalizing connection between the motors $M^1$ and $M^2$, an expedient well-known to those familiar with the parallel operation of electric motors. Under this condition the motors will act as generators driven by the load or by the inertia of the moving parts and will send current through the resistance $R^1$, $R^2$, $R^3$ and $R^4$, thereby producing dynamic braking. By turning the master-switch back through its braking positions the switches 1, 2, 3 and 4 may be caused to close in succession under the control of the notching relay P in the same manner as when the master-switch is in its power positions. The switch $D^1$ in closing closes its upper auxiliary switch which completes the actuating circuit for the operating coils of the switches 1, 2, 3 and 4 through the actuating coil and contacts of the notching relay P in the same manner as does the switch L when the master-switch is in the power positions. The switches $L^5$, $D^2$ and $L^7$ by their upper auxiliary switches connect their respective actuating coils to a circuit which leads to the finger $n$ on the master-switch, as will be clear from the diagram. As long as the master-switch is in a brake position the brakes $B^1$ and $B^2$ will be maintained released and the motors will be connected for dynamic braking in a closed circuit through more or less of the resistance. During dynamic braking and power operation the relay Q will hold its contacts closed as long as the current in the motor circuit exceeds a certain value or until the switch 4 closes and short circuits the resistance $R^4$ and the actuating coil of the relay Q. While, however, the master-switch is in a "brake" position, or in a power position, the circuit through the contacts of the relay Q serves no useful purpose. If, however, the master-switch is thrown quickly from a "forward" position back through its "brake" positions to its "off" position, the circuit through the contacts of the relay Q and through the fingers $m$ and $n$ and their coöperating segments becomes useful as a maintaining circuit for the switches $D^1$, 1, 2, 3, 4, $L^5$, $L^6$, $D^2$, $L^7$, $L^8$ and the releasing coils of the brakes $B^1$ and $B^2$, as will be clear from the diagram. The relay Q will maintain this circuit complete until the current in the motor circuit becomes less than a certain value or until the last section of resistance $R^4$ has been short-circuited by the closing of the switch 4. When either of the two last named conditions occur the relay Q drops, the brakes $B^1$ and $B^2$ are applied and the switches controlling the motor circuit open. From this it will be apparent that the operator can throw his master-switch from a coasting to an "off" position and cause the motors to brake dynamically and be finally brought to rest and held by the brakes $B^1$ and $B^2$. In practice it is easy to design the system so that by the time the last section of resistance $R^4$ has been short-circuited during the dynamic braking, the motors will have come substantially to rest and the brakes $B^1$ and $B^2$ will have to do little more than hold them. The arrangement is such, however, that if for any reason the connections for dynamic braking are interrupted, (as by failure of current in the control circuits allowing the switches to open) the mechanical brakes will be at once applied and will bring the motors to rest.

Although I have described the operation of the system shown, only for "forward" manipulation of the master-switch, it will be obvious that the system will operate in a similar manner when the master-switch is turned in the "reverse" direction.

While I have shown but one arrangement in which my invention may be embodied, I do not wish to be understood as limiting it thereto except as called for by the following claims.

What I claim as new and desire to secure by Letters Patent of the United States, is—

1. In a system of motor control, a motor, a starting resistance therefor, a controller for connecting said motor to a source of current for either direction of rotation, for regulating the amount of resistance in the motor circuit and for short-circuiting said motor through said resistance for dynamic braking, a master-switch for controlling the operation of said controller having "forward" and "reverse" power and braking positions, and means for maintaining said controller in the braking condition after the master switch has been thrown to "off" position until the motor has come substantially to rest.

2. In a system of motor control, a motor, a starting resistance therefor, a plurality of electrically controlled switches for connecting said motor to a source of current for either direction of rotation, for regulating the amount of resistance in the motor circuit and for short-circuiting said motor through said resistance for dynamic braking, a master switch having "forward" and "reverse" power and braking positions for controlling said electrically controlled switches, and means for maintaining said electrically controlled switches in the braking condition when said master switch is thrown to "off" position, until the motor has come substantially to rest.

3. In a system of motor control, a motor, a starting resistance therefor, a plurality of electrically controlled switches for connecting said motor to a source of current for either direction of rotation, for regulating the amount of resistance in the motor circuit and for short-circuiting said motor through said resistance for dynamic braking, a master switch for controlling the operation of said electrically controlled switches having "forward" and "reverse" braking, coasting and power positions, and means for completing a maintaining circuit for said electrically controlled switches in the "off" position of the master switch which will hold the electrically controlled switches in the braking condition for the then existing direction of rotation of the motor, until the motor has come substantially to rest.

4. In a system of motor control, a motor, a starting resistance therefor, a controller comprising a plurality of electrically controlled switches for connecting said motor to a source of current for either direction of rotation, for regulating the amount of resistance in the motor circuit and for short-circuiting the motor through said resistance for dynamic braking, a master switch for controlling the operation of said electrically controlled switches having "forward" braking, coasting and power positions and "reverse" braking, coasting and power positions, the master switch being effective in its braking positions only after it has first been turned to its coasting or power positions for that direction of rotation, and means for maintaining said electrically controlled switches in the braking condition after the master switch has been returned to the "off" position from a coasting or power position through the braking positions, until the motor has come substantially to rest.

5. In a system of motor control, a motor, a starting resistance therefor, a controller comprising a plurality of electrically controlled switches for connecting said motor to a source of current for either direction of rotation, for regulating the amount of resistance in the motor circuit and for short-circuiting the motor through a resistance for dynamic braking, a master switch for controlling the operation of said electrically controlled switches having "forward" braking, coasting and power positions and "reverse" braking, coasting and power positions, and a relay energized from the motor circuit for completing a maintaining circuit for said electrically controlled switches in the "off" position of the controller which will hold the electrically controlled switches in the braking condition for the then existing direction of rotation of the motor, until the motor has come substantially to rest.

6. In a system of motor control, a motor, a starting resistance therefor, a controller comprising a plurality of electrically controlled switches for connecting said motor to a source of current for either direction of rotation, for regulating the amount of resistance in the motor circuit and for short-circuiting the motor through a resistance for dynamic braking, a master switch for controlling the operation of said electrically controlled switches comprising a set of fixed contact fingers and a drum coöperating therewith capable of rotation in either direction from "off" position to give "forward" braking, coasting and power positions and "reverse" braking, coasting and power positions, and a relay energized from the motor circuit for completing a maintaining circuit for said electrically controlled switches in the "off" position of the master switch which will hold the electrically controlled switches in the braking condition for the then existing direction of rotation of the motor, until the motor has come substantially to rest.

7. In a system of motor control, a motor, a starting resistance therefor, a controller comprising a plurality of electrically controlled switches for connecting said motor to a source of current for either direction of rotation, for regulating the amount of resistance in the motor circuit, and for short-circuiting the motor through a resistance for dynamic braking, a master switch for controlling the operation of said electrically controlled switches having "forward" braking, coasting and power positions and "reverse" braking, coasting and power positions, and a relay energized from the motor circuit, and arranged to be deënergized when the last section of resistance is cut out, for completing a maintaining circuit for said electrically controlled switches in the "off" position of the master switch which will hold the electrically controlled switches in the braking condition for the then existing direction of rotation of the motor until the last section of resistance is cut out.

8. In a system of motor control, a motor, a starting resistance therefor, a controller comprising a plurality of electrically controlled switches for connecting said motor to a source of current for either direction of rotation, for regulating the amount of resistance in the motor circuit, and for short-circuiting the motor through a resistance for dynamic braking, a master switch for controlling the operation of said electrically controlled switches having "forward" braking, coasting and power positions and "reverse" braking, coasting and power positions, the switch being effective in its braking positions only after it has first been turned to its coasting or power positions for that direction of rotation, and a relay energized from the motor circuit, and arranged to be deënergized when the last section of resistance is cut out, for completing a maintaining circuit for said electrically controlled switches in the "off" position of the master switch which will hold the electrically controlled switches in the braking condition for the then existing direction of rotation of the motor until the last section of resistance is cut out.

9. In a system of motor control, a motor, a starting resistance therefor, a controller for connecting said motor to a source of current for either direction of rotation, for regulating the amount of resistance in the motor circuit, and for short-circuiting said motor through said resistance for dynamic braking, a master switch for controlling the operation of said controller having "forward" and "reverse" power and braking positions, an electrically released brake for said motor, and means for maintaining said controller in the braking condition and for maintaining the electrically controlled brake released after the master switch has been thrown to "off" position until the motor has come substantially to rest.

10. In a system of motor control, a motor, a starting resistance therefor, a controller comprising a plurality of electrically controlled switches for connecting said motor to a source of current for either direction of rotation, for regulating the amount of resistance in the motor circuit, and for short-circuiting said motor through said resistance for dynamic braking, a master switch having "forward" and "reverse" power and braking positions for controlling said electrically controlled switches, an electrically controlled brake for said motor released when said master switch is in a power or braking position, and means for completing a maintaining circuit for said electrically controlled switches and for said brake in the "off" position of the master switch arranged to hold the electrically controlled switches in the braking condition for the then existing rotation of the motor and to hold said brake released until the motor has come substantially to rest.

11. In a system of motor control, a motor, a starting resistance therefor, a controller comprising a plurality of electrically controlled switches for connecting said motor to a source of current for either direction of rotation, for regulating the amount of resistance in the motor circuit, and for short-circuiting said motor through said resistance for dynamic braking, a master switch having "forward" and "reverse" power and braking positions for controlling said electrically controlled switches, an electrically controlled brake for said motor arranged to be released when said master switch is in a power or braking position, a relay having its actuating coil energized from the motor circuit and arranged to be deënergized by the closing of one of the resistance controlling switches, and a maintaining circuit controlled by said relay for maintaining said controller in a braking condition and said brakes released when the master switch is in the "off" position until the current in the motor circuit is decreased to a certain value or the actuating coil of the relay has been deënergized by the closing of said resistance controlling switch.

In witness whereof, I have hereunto set my hand this 31st day of July, 1908.

HAROLD E. WHITE.

Witnesses:
BENJAMIN B. HULL,
HELEN ORFORD.